United States Patent
Mao

(10) Patent No.: US 9,811,185 B2
(45) Date of Patent: Nov. 7, 2017

(54) INFORMATION PROCESSING METHOD AND ELECTRONIC DEVICE

(71) Applicants: Beijing Lenovo Software Ltd., Haidian District, Beijing (CN); Lenovo (Beijing) Co., Ltd., Beijing (CN)

(72) Inventor: Mingxu Mao, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 219 days.

(21) Appl. No.: 14/077,719

(22) Filed: Nov. 12, 2013

(65) Prior Publication Data

US 2014/0132513 A1    May 15, 2014

(30) Foreign Application Priority Data

Nov. 13, 2012    (CN) .................... 2012 1 0453548 U

(51) Int. Cl.
    *G06F 3/041*    (2006.01)
(52) U.S. Cl.
    CPC ............ *G06F 3/041* (2013.01); *G06F 3/0416* (2013.01); *G06F 3/0418* (2013.01)
(58) Field of Classification Search
    CPC ........... G06F 11/3466; G06F 2201/815; G06F 3/0488; G06F 11/3485; G06F 1/1626;
    (Continued)

(56) References Cited

U.S. PATENT DOCUMENTS

| 7,199,787 B2 | 4/2007 | Lee |
| 7,199,797 B2 * | 4/2007 | Cheng ............................. 345/470 |

(Continued)

FOREIGN PATENT DOCUMENTS

| CN | 1402116 | 3/2003 |
| CN | 1782975 | 6/2006 |

(Continued)

OTHER PUBLICATIONS

Office Action, and English language translation thereof, in corresponding Chinese Application No. 201210453548.2, dated Jan. 12, 2017, 21 pages.

(Continued)

*Primary Examiner* — Duc Dinh
(74) *Attorney, Agent, or Firm* — Brinks Gilson & Lione; G. Peter Nichols

(57) ABSTRACT

An information processing method and an electronic device comprising a touch sensitive unit and a display unit separated from each other are described. The electronic device includes at least a first display mode, and a second display mode suitable for the touch sensitive unit. The method includes acquiring a third display mode of the display unit at a first timing when the electronic device is turned on; detecting whether the third display mode is the second display mode or not; acquiring coordinates of each point of N points of the display unit and generating a first control instruction, when the third display mode is the second display mode, wherein N is an integer above 2; and performing the first control instruction, to correspond the coordinates of the each point of the N points to coordinates of each touch sensitive point of the touch sensitive unit.

6 Claims, 3 Drawing Sheets

(58) Field of Classification Search
CPC .... G06F 1/1647; G06F 21/554; G06F 21/566;
G06F 3/0481; G06F 3/14; G06F 3/1423;
G06F 9/4445; G06F 11/0712; G06F
9/4405; G06F 3/04842; G06F 3/0482;
G06F 3/03545; G06F 3/0412; G06F
3/044; G06F 3/04817; G06F 3/04847;
G06F 9/445; G06F 12/0806; G06F
17/30696; G06F 3/038; G06F 3/041;
G06F 2203/04808; G06F 3/04883; G06F
3/04886; G06F 1/163; G06F 3/0418;
G06F 15/0225; G06F 2203/04809; G06F
3/03547; G06F 9/4443; G06F 1/1632;
G06F 2221/2105; G06F 1/1616; G06F
1/1654; G06F 9/44505; G06F 11/1482;
G06F 3/017; G06F 3/0416; G06F 1/16;
G06F 1/1692; G06F 1/1694; G06F 21/53;
G06F 21/6281; G06F 2221/033
USPC .................................. 345/156–169, 173–175
See application file for complete search history.

(56) References Cited

U.S. PATENT DOCUMENTS

| | | |
|---|---|---|
| 8,754,855 B2 | 6/2014 | Duncan |
| 2003/0025678 A1 | 2/2003 | Lee |
| 2006/0119588 A1 | 6/2006 | Yoon |
| 2009/0322687 A1 | 12/2009 | Duncan |
| 2011/0018828 A1 | 1/2011 | Wu |
| 2011/0022990 A1 | 1/2011 | Wu |
| 2011/0191723 A1 | 8/2011 | Wu |
| 2011/0265021 A1* | 10/2011 | Chien ................. G06F 3/04883 715/769 |
| 2012/0084480 A1* | 4/2012 | Reeves .................. G06F 13/14 710/303 |
| 2012/0110496 A1 | 5/2012 | Lee |
| 2012/0299814 A1* | 11/2012 | Kwon ............... H04M 1/72583 345/156 |
| 2014/0002328 A1* | 1/2014 | Yamamichi ................... 345/1.1 |

FOREIGN PATENT DOCUMENTS

| | | |
|---|---|---|
| CN | 101498984 | 8/2009 |
| CN | 101963858 | 2/2011 |
| CN | 102253744 | 11/2011 |
| CN | 102469211 | 5/2012 |
| EP | 1 990 707 | 11/2008 |
| WO | WO 2009/158685 | 12/2009 |

OTHER PUBLICATIONS

First Office Action dated May 4, 2016 out of Chinese priority Application No. 201210453548.2 (25 pages including English translation).

* cited by examiner

INFORMATION PROCESSING METHOD AND ELECTRONIC DEVICE

BACKGROUND

This application claims priority to Chinese patent application No. 201210453548.2 filed on Nov. 13, 2012, the entire contents of which are incorporated herein by reference.

The present disclosure relates to the computer technology field, and more particularly, to an information processing method and an electronic device.

With the development of the computer technology, currently, an electronic device may be operated through a touch sensitive board, so that a user may operate the electronic device more easily. For example, the current notebook computer generally comprises a touch sensitive board and a display separate from each other, and the staying location of the cursor on the display is controlled by acquiring the movement track on the touch sensitive board by the user.

The inventor of the present disclosure found at least the following technical problems in the prior art when implementing the technical solution of the embodiment of the present disclosure.

There is a technical problem about the existing electronic device in that the location of the cursor is not accurate when the touch sensitive unit and the display unit are separated from each other. The staying location of the cursor on the display unit is computed by acquiring the movement track of the operating object on the touch sensitive board, and performing corresponding computations on the movement track. Since the electronic device needs to compute the movement track, the accuracy of the cursor location is affected.

When the movement track is very complicated, the response time is relatively long, it is not convenient for the user to use, and the user experience is poor.

SUMMARY

The embodiments of the present disclosure provide an information processing method and an electronic device, to solve the technical problem of inaccurate cursor location when the touch sensitive unit and the display unit of the electronic device are in a separate state.

In an embodiment of the present disclosure, an information processing method is provided, which is applied to an electronic device comprising a touch sensitive unit and a display unit separated from each other, the electronic device comprising at least a first display mode, and a second display mode suitable for the touch sensitive unit, the method comprising: acquiring a third display mode of the display unit at a first timing when the electronic device is turned on; detecting whether the third display mode is the second display mode or not; acquiring coordinates of each point of N points of the display unit and generating a first control instruction, when the third display mode is the second display mode, wherein N is an integer above 2; and performing the first control instruction, to correspond the coordinates of the each point of the N points to coordinates of each touch sensitive point of the touch sensitive unit.

Optionally, after the step of detecting whether the third display mode is the second display mode or not, the method further comprises: acquiring a first location of a cursor on the display unit when the third display mode is the first display mode; acquiring a movement track parameter indicating the movement on the touch sensitive unit of an operating object corresponding to the electronic device; acquiring a second location of the cursor on the display unit based on the first location and the movement track parameter; and adjusting the cursor from the first location to the second location.

Optionally, after the step of performing the first control instruction, to correspond the coordinates of the each point of the N points to coordinates of each touch sensitive point of the touch sensitive unit, the method further comprises: acquiring M first touch sensitive points out of the N touch sensitive points of a first operating object corresponding to the electronic device, wherein M is an integer no less than 1 and larger than N; acquiring J points corresponding to each touch sensitive point of the M first touch sensitive points based on the M first touch sensitive points, wherein J is equal to M; and allocating a cursor at the location of each point of the J points.

Optionally, the step of performing the first control instruction, to correspond the coordinates of the each point of the N points to coordinates of each touch sensitive point of the touch sensitive unit comprises: acquiring the coordinates of each touch sensitive point of the N touch sensitive points of the touch sensitive unit when performing the first control instruction; and corresponding the coordinates of each point of the N points to the coordinates of each touch sensitive point of the N touch sensitive points.

Optionally, after the step of performing the first control instruction, to correspond the coordinates of the each point of the N points to coordinates of each touch sensitive point of the touch sensitive unit, the method further comprises: detecting whether a first adjustment instruction for adjusting display mode of the display unit is received or not, at a second timing after the first timing; and adjusting the display unit from the second display mode to the first display mode, when the first adjustment instruction is received.

Optionally, the step of detecting whether the third display mode is the second display mode or not comprises: detecting whether the operating system of the electronic device is WINDOWS 8 or not; and detecting whether the third display mode is the second display mode by detecting whether the electronic device is operating Metro program, when the operating system of the electronic device is WINDOWS 8.

In another embodiment of the present disclosure, an electronic device is provided, which comprises a touch sensitive unit and a display unit separated from each other, the electronic device comprising at least a first display mode, and a second display mode suitable for the touch sensitive unit, the electronic device comprising: an electronic board; and a processing chip disposed on the electronic board, which is configured to acquire a third display mode of the display unit at a first timing when the electronic device is turned on, to detect whether the third display mode is the second display mode or not, to acquire coordinates of each point of N points of the display unit and generate a first control instruction when the third display mode is the second display mode, wherein N is an integer above 2, and to perform the first control instruction, to correspond the coordinates of the each point of the N points to coordinates of each touch sensitive point of the touch sensitive unit.

Optionally, the processing chip comprises a relative location unit, configured to acquire a first location of a cursor on the display unit when the third display mode is the first display mode after detecting whether the third display mode is the second display mode or not, to acquire a movement track parameter indicating the movement on the touch sensitive unit of an operating object corresponding to the electronic device, to acquire a second location of the cursor on the display unit based on the first location and the movement track parameter; and to adjust the cursor from the first location to the second location.

Optionally, the processing chip comprises a cursor control unit, configured to acquire M first touch sensitive points out of the N touch sensitive points of a first operating object corresponding to the electronic device, wherein, M is an integer no less than 1 and larger than N, after performing the first control instruction, to correspond the coordinates of the each point of the N points to coordinates of each touch sensitive point of the touch sensitive unit, to acquire J points corresponding to each touch sensitive point of the M first touch sensitive points based on the M first touch sensitive points, wherein, J is equal to M, and to allocate a cursor at the location of each point of the J points.

Optionally, the processing chip comprises an absolute location unit, configured to acquire the coordinates of each touch sensitive point of the N touch sensitive points of the touch sensitive unit when performing the first control instruction, and to correspond the coordinates of each point of the N points to the coordinates of each touch sensitive point of the N touch sensitive points.

Optionally, the processing chip comprises a mode adjustment unit, configured to detect whether a first adjustment instruction for adjusting display mode of the display unit is received or not, at a second timing after the first timing, after performing the first control instruction, and to adjust the display unit from the second display mode to the first display mode, when the first adjustment instruction is received.

Optionally, the processing chip comprises a mode detection unit, configured to detect whether the operating system of the electronic device is WINDOWS 8 or not, and to detect whether the third display mode is the second display mode by detecting whether the electronic device is operating Metro program, when the operating system of the electronic device is WINDOWS 8.

The one or more technical solutions provided in the embodiments of the present disclosure have at least the following technical effects or advantages.

First, the coordinates of the each point of the N points of the display unit correspond to coordinates of each touch sensitive point of the touch sensitive unit, when it is detected that the third display mode of the display unit of the electronic device is the second display mode, when the touch sensitive unit and the display unit are separated from each other and the electronic device is turned on and at the first timing, in the embodiment of the present disclosure. Therefore, the staying location of the cursor on the display unit may be determined directly by the correspondence between the N points of the display unit and the N touch sensitive points of the touch sensitive unit. Then, the technical problem of inaccurate cursor location when the touch sensitive unit and the display unit are in the separate state of the existing electronic device is solved. Further, the technical effect of a more accurate cursor location when the touch sensitive unit and the display unit are in the separate state is achieved, and it is more convenient for the user to use and the user experience is better.

Second, in the embodiments of the present disclosure, when performing the first control instruction to correspond the coordinates of the each point of the N points to coordinates of each touch sensitive point of the touch sensitive unit, M first touch sensitive points out of the N touch sensitive points of a first operating object may be acquired, J points corresponding to the M first touch sensitive points are acquired based on the M first touch sensitive points, and a cursor at the location of each point of the J points is allocated. When M is an integer above 2, multi-point operation may be performed on the display unit by the touch sensitive point. The operation procedure is further simplified, and the operation is easier, which is more convenient for the user to use and the user experience is better.

Third, in the embodiments of the present disclosure, the current display mode of the display unit may be adjusted by the first adjustment instruction for adjusting the display mode of the display unit at the second timing after the first timing, so that the display mode of the display unit is adjusted from the second display mode to the first display mode. Also, the correspondence between the touch sensitive unit and the display unit is different in different display modes. Thus, the electronic device provides multiple display modes for the user to select. The user may adjust the display mode of the display unit according to his/her own use customs. The application of the electronic device is improved, and it is further convenient for the user to use, and the user experience is better.

DETAILED DESCRIPTION

The technical problem of inaccurate location of cursor when the touch sensitive unit and the display unit are separated from each other in the existing electronic device is solved by an information processing method and an electronic device according to the present disclosure.

In order to solve the above technical problem, the technical solution of the embodiments of the present disclosure generally is of the following concept.

The coordinates of the each point of N points of the display unit correspond to coordinates of each touch sensitive point of the touch sensitive unit, when detecting that a third display mode of the display unit is a second display mode at a first timing when the electronic device is turned on, when the touch sensitive unit and the display unit of the electronic device are separated from each other in the embodiments of the present disclosure. Thus, the staying location of the cursor on the display unit may be determined directly from the correspondence between the N points of the display unit and the touch sensitive points of the touch sensitive unit, so that the technical problem of inaccurate cursor location when the touch sensitive unit and the display unit of the electronic device are in separate states is solved. Further, the technical effect of more accurate cursor location when the touch sensitive unit and the display unit of the electronic device are separated from each other is achieved, so that it is more convenient for the user to use, and the user experience is better.

To better understand the above technical solution, it will be described in detail with reference to the figures and the detailed embodiments.

In an embodiment of the present disclosure, an information processing method applied to an electronic device is provided, the electronic device comprising a touch sensitive unit and a display unit separated from each other, the electronic device comprising at least a first display mode, and a second display mode suitable for the touch sensitive unit. The electronic device is for example an electronic device such as a tablet computer, a notebook computer, a PC etc.

The touch sensitive unit is for example a touch sensitive board, a touch screen and so on. Further, the display unit is for example a LCD display, a LED display and so on.

Figure 1:
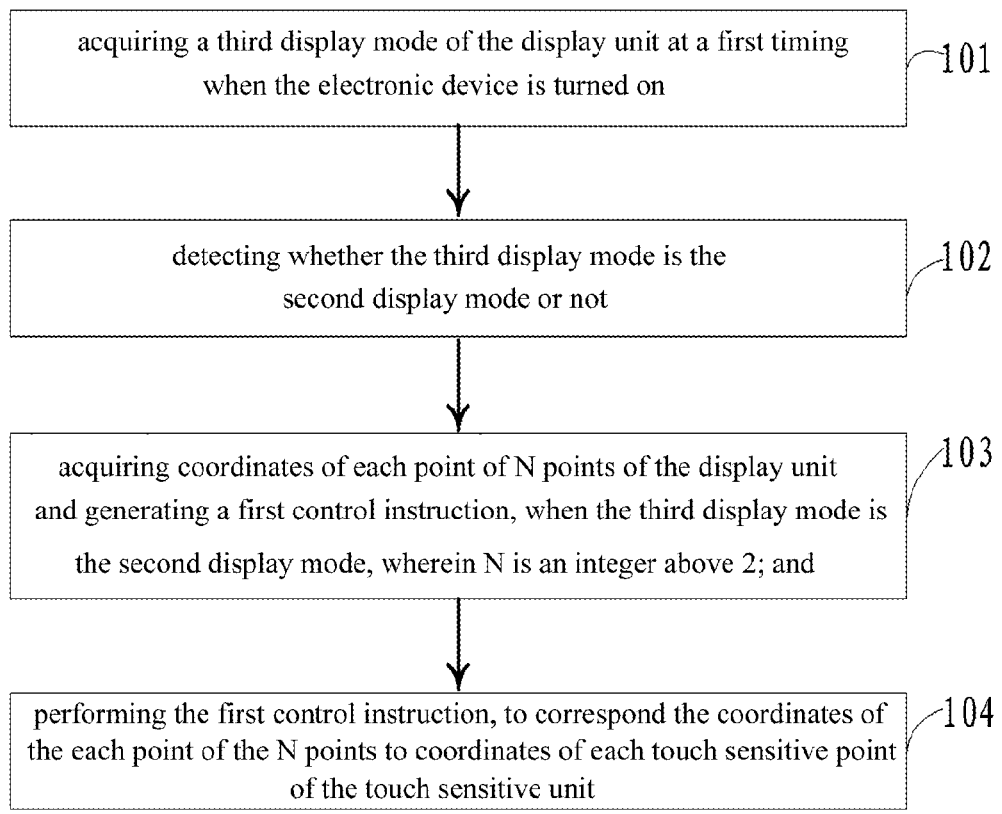
FIG. 1 is a flowchart showing an information processing method according to a first embodiment of the present disclosure.

Referring to FIG. 1, the method comprises:

step 101: acquiring a third display mode of the display unit at a first timing when the electronic device is turned on;

step 102: detecting whether the third display mode is the second display mode or not;

step 103: acquiring coordinates of each point of N points of the display unit and generating a first control instruction, when the third display mode is the second display mode, wherein N is an integer above 2; and step 104: performing the first control instruction, to correspond the coordinates of the each point of the N points to coordinates of each touch sensitive point of the touch sensitive unit.

In step 101, the third display mode of the display unit is acquired at a first timing when the electronic device is turned on. In detailed implementations, firstly, it is detected whether the electronic device is in an on state or not. When it is detected that the electronic device is turned on, the current first timing of the electronic device is acquired, and the third display mode of the display unit is acquired.

The first display mode is a traditional mode for display on a PC or a notebook computer. The traditional mode is a display mode of a PC installed with an operating system such as WINDOWS 7, UNIX, and so on. Further, the second display mode is a display mode applied to a touch screen with an operating system such as Android, iOS, Windows 8 and so on.

In particular, the third display mode of the display unit is acquired by detecting the operating system and/or program running in the electronic device at the first timing when the electronic device is turned on. For example, WINDOWS 7 system and Android system are installed in the notebook. When WINDOWS 7 system is operating in the notebook, the first display mode is used by the display screen of the notebook. When Android system is operating in the notebook, the second display mode is used by the display screen of the notebook. The first timing displayed when the notebook is turned on is a time such as 10:15, 11:35, 9:30 etc. The third display mode of the display unit at the first timing is acquired by detecting the operating system and/or program operating in the notebook. Of course, the electronic device may be installed with other operating systems, such as UNIX system and Android system, or UNIX system, WINDOWS 7 system and iOS system, and so on. The third display mode of the display unit is acquired according to different systems operating in the electronic device.

In practical applications, when the electronic device is turned on at the first timing, the third display mode of the display unit is acquired by detecting program operating in the electronic device. For example, no APP applications are set up in operating systems such as WINDOWS 7, UNIX, and so on, while APP applications may operate in operating systems such as iOS, WINDOWS 8, and so on. Thus, the third display mode of the display unit may be acquired by detecting whether the electronic device is operating APP applications or not. Of course, the third display mode of the display unit may be acquired by detecting the operating system and the operating program operating in the electronic device at the same time.

After performing step 101, step 102 is performed, and it is detected whether the third display mode is the second display mode or not. In detailed implementations, it is described in step 101 that the third display mode of the display unit may be determined by detecting the operating system and/or program operating in the electronic device. Similarly, when detecting whether the third display mode is the second display mode or not, the operating system and/or program operating in the third display mode may be acquired. Then, it is detected whether the operating system and/or program operating in the third display mode matches with the operating system and/or program operating in the second display mode or not. It is detected whether the third display mode is the second display mode or not by use of the match result.

In particular, taking the notebook as an example, it is installed with WINDOWS 7 system and iOS system. When the notebook is operating WINDOWS 7 system, the first display mode is used by the display screen of the notebook. When the notebook is operating iOS system, the second display mode is used by the display screen of the notebook. When the notebook is turned on and at the first timing of 10:15:15, the third display mode of the display screen is acquired, and it is detected that the operated system in the notebook is WINDOWS 7 system, while the notebook operates iOS system in the second display mode. Therefore, WINDOWS 7 system operating in the third display mode does not match with iOS system operating in the second display mode. Then, it is determined that the third display mode is not the second display mode. If it is detected that the notebook operates iOS system in the third display mode, it is determined that the third display mode is the second display mode.

When the third display mode is the second display mode, step 103 is performed, coordinates of each point of N points of the display unit are acquired and a first control instruction is generated, wherein N is an integer above 2. In detailed implementations, after the determination of step 102, when it is detected that the third display mode is the second display mode, N points of the display unit are determined, and coordinates of each point of the N points are acquired to generate the first control instruction, so that the display unit corresponds to the touch sensitive unit.

The N points of the display unit may be all pixel points of the display unit, or may be determined by dividing the display unit according to a predetermined rule by the electronic device. For example, the predetermined rule may be that the several adjacent pixel points may be combined as one point of the N points. For example, 4, 5 or 6 etc. number of pixel points may be combined as one point of the N points. The N points of the display unit may also be determined by distance. For example, taking one point at the upper left corner of the display unit as the origin, the distance between each adjacent two points is 5 mm. Thus, N points of the display unit may be acquired.

Figure 2:
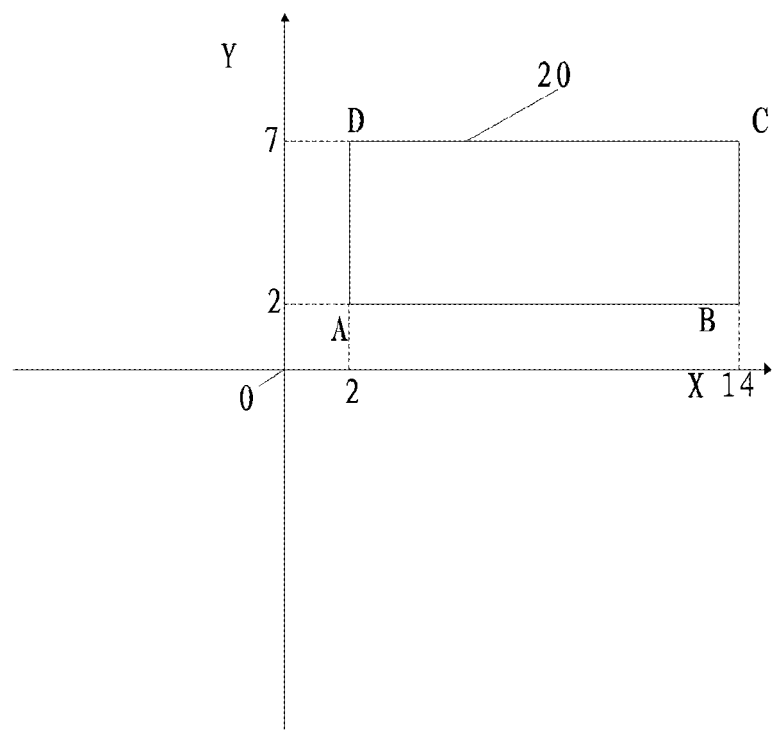
FIG. 2 is a flowchart showing an information processing method according to a second embodiment of the present disclosure.

In particular, after determining the N points of the display unit, a two dimensional (2D) coordinate axis is set up, coordinates of each point of the N points are determined based on the coordinates of each point of the N points on the coordinate axis, and then the first control instruction is generated so that the display unit and the touch sensitive unit correspond to each other. For example, as shown in FIG. 2, the 2D coordinate axis is formed by the X axis and Y axis vertically to each other. The display unit 20 is set in the 2D coordinate axis. According to the location of the display unit 20 on the 2-D coordinate axis, it may be determined that the coordinates of point A of the display unit 20 are (2,2), the coordinates of point B of the display unit 20 are (14,2), the coordinates of point C of the display unit 20 are (14,7), and the coordinates of point D of the display unit 20 are (2,7). After determining the coordinates of each point of the N points of the display unit 20, the first control instruction is generated.

After performing step 103, step 104 is performed, wherein, the first control instruction is performed, to correspond the coordinates of the each point of the N points to coordinates of each touch sensitive point of the touch sensitive unit. In detailed implementations, when the first control instruction is performed, coordinates of each touch sensitive point of N touch sensitive points of the touch sensitive unit are acquired, and the coordinates of the each point of the N points correspond to coordinates of each touch sensitive point of the touch sensitive unit.

Figure 3:
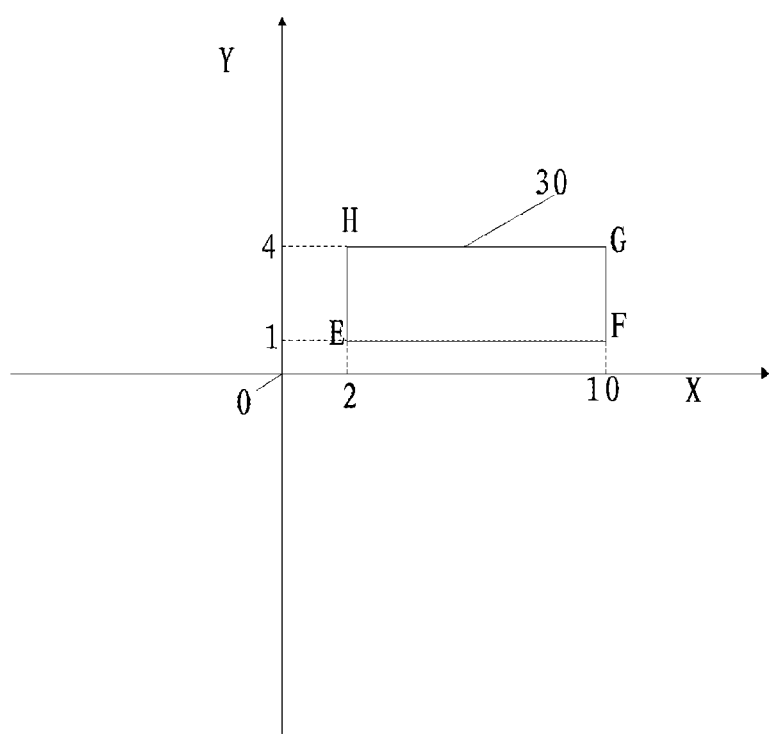
FIG. 3 is a flowchart showing an information processing method according to a third embodiment of the present disclosure.

In particular, after generating the first control instruction in step 103, N touch sensitive points of the touch sensitive unit are acquired when performing the first control instruction. Again, a 2D coordinate axis is set up to acquire coordinates of each touch sensitive point of N touch sensitive points, and then to correspond the coordinates of the each point of the N points of the display unit to coordinates of each touch sensitive point of the N touch sensitive points. For example, as shown in FIG. 3, the 2-D coordinate axis is formed by the X axis and Y axis vertically to each other. The touch sensitive unit 30 is set in the 2-D coordinate axis. According to the location of the touch sensitive unit 30 on the 2-D coordinate axis, it may be determined that the coordinates of point E of the touch sensitive unit 30 are (2,1), the coordinates of point F of the touch sensitive unit 30 are (10,1), the coordinates of point G of the touch sensitive unit 30 are (10,4), and the coordinates of point H of the touch sensitive unit 30 are (2,4). After determining the coordinates of each point of the N points of the touch sensitive unit 30, the coordinates of the each point of the N points of the display unit correspond to coordinates of each touch sensitive point of the N touch sensitive points.

In practical implementations, taking an example in which coordinates of each point of the N points of the display unit are as shown in FIG. 2 and coordinates of each touch sensitive point of the N touch sensitive points of the touch sensitive unit are as shown in FIG. 3, the coordinates of point A correspond to the coordinates of point E, the coordinates of point B correspond to the coordinates of point F, the coordinates of point C correspond to the coordinates of point G, and the coordinates of point D correspond to the coordinates of point H, and the coordinates of other points of the N points of the display unit correspond to the coordinates of other points of the N points of the touch sensitive unit respectively, similar to the points A, B, C and D. Of course, it is also possible that the coordinates of point A correspond to the coordinates of point H, the coordinates of point B correspond to the coordinates of point G, the coordinates of point C correspond to the coordinates of point F, the coordinates of point D correspond to the coordinates of point E, and the coordinates of other points of the N points of the display unit correspond to the coordinates of other points of the N points of the touch sensitive unit respectively, similar to the points A, B, C and D.

In another embodiment, after detecting whether the third display mode is the second display mode or not, the method further comprises: acquiring a first location of a cursor on the display unit when the third display mode is the first display mode; acquiring a movement track parameter indicating the movement on the touch sensitive unit of an operating object corresponding to the electronic device; acquiring a second location of the cursor on the display unit based on the first location and the movement track parameter; and adjusting the cursor from the first location to the second location.

In detailed implementations, the third display mode may be determined as the first display mode, when detecting the third display mode is the first display mode in step 102, for example, the first display mode is used by the display screen of the notebook when WINDOWS 7 system is operating in the notebook; the second display mode is used by the display screen of the notebook when iOS system is operating in the notebook, and when the notebook is turned on at the timing of 10:25, it is operating WINDOWS 7 system. When the display unit is in the first display mode, the first location of the cursor on the display unit is determined firstly. Then, a movement track parameter indicating the movement on the touch sensitive unit of an operating object corresponding to the electronic device is acquired. Then, the movement track parameter is computed based on the computation formula built in the electronic device, so that a second location of the cursor on the display unit is acquired, and the cursor is adjusted from the first location to the second location.

In another embodiment, after performing the first control instruction, to correspond the coordinates of the each point of the N points to coordinates of each touch sensitive point of the touch sensitive unit, M first touch sensitive points out of the N touch sensitive points of a first operating object corresponding to the electronic device may be also acquired, wherein, M is an integer no less than 1 and larger than N. Then, J points corresponding to each touch sensitive point of the M first touch sensitive points are acquired on the display unit based on the M first touch sensitive points, wherein, J is equal to M. And then, a cursor at the location of each point of the J points is allocated.

In detailed implementations, after performing step 104, it is detected whether the first operating object touches the touch sensitive unit or not. When it touches the touch sensitive unit, M first touch sensitive points out of the N touch sensitive points of a first operating object corresponding to the electronic device are acquired. Since the coordinates of the each point of the N touch sensitive points correspond to coordinates of each point of the N points of the display unit, J points of the display unit and the coordinates of each point of the J points may be determined based on the acquired coordinates of the M first touch sensitive points. Then, the location of each point of the J points may be determined based on the coordinates of the each point, so that a cursor at the location of each point of the J points may be allocated. For example, as shown in FIGS. 2 and 3, the first operating object touches points E and F of the touch sensitive unit 30, then a cursor is allocated at points A and B of the display unit, respectively, so that the electronic device may support multi-point operation. For example, operation items corresponding to points A and B may be selected simultaneously or input may be done through points A and B simultaneously.

In another embodiment, after performing the first control instruction, to correspond the coordinates of the each point of the N points to coordinates of each touch sensitive point of the touch sensitive unit, it is detected whether a first adjustment instruction for adjusting display mode of the display unit is received or not, at a second timing after the first timing. Then, the display unit is adjusted from the second display mode to the first display mode, when the first adjustment instruction is received.

In the step of detecting whether a first adjustment instruction for adjusting display mode of the display unit is received or not, in detailed implementations, the first adjustment instruction may be trigged by operating a specific application program. For example, the first adjustment instruction may be trigged by running a short segment of code or by starting an application program such as QQ etc. Alternatively, it may be trigged by performing a specific gesture operation. For example, the first adjustment instruction is triggered or generated by a gesture operation of drawing a circle or an arch clockwise by the user. Alternatively, it may be triggered by pressing a set key. For example, it may be trigged by pressing a number key, such as the number key of 1~9 corresponding to the trigger operation, or by pressing a letter key. Alternatively, it may be trigged by voice. For example, the first adjustment instruction is trigged or generated when the electronic device receives a specific voice data, such as "adjusting the display mode", "converting to the first display mode", etc., sent by the user.

In detailed implementations, when a notebook is turned on and the current time is 10:35, iOS system is operating in the notebook, then it may be determined that the notebook is in the second display mode. Then, the coordinates of the each point of the N points of the display unit correspond to coordinates of each touch sensitive point of the N touch sensitive points of the touch sensitive unit. At 10:36, it is detected whether the first adjustment instruction is received or not by detecting whether voice data of "adjusting the display mode" is received or not. When the voice data is received, it may be determined that the first adjustment instruction is received and the first adjustment instruction is performed to adjust the display unit from the second display mode to the first display mode.

In another embodiment, the detection of whether the third display mode is the second display mode may be done by detecting whether the OS of the electronic device is WINDOWS 8. When the OS of the electronic device is WINDOWS 8, it is detected that the third display mode is the second display mode by detecting whether the electronic device operates Metro program.

In detailed implementations, when the electronic device is installed with WINDOWS 8 system, since WINDOWS 8 system comprises 2 display modes comprising the first display mode and the second display mode, the current display mode of the display unit of the electronic device is the second display mode when the Metro program is operating in the electronic device, and the current display mode of the display unit of the electronic device is the first display mode when the Metro program is not operating in the electronic device. Thus, when the electronic device is installed with WINDOWS 8 system, the detection of whether the third display mode is the second display mode may be done by detecting whether the electronic device is operating Metro program.

The one or more technical solutions provided in the embodiments of the present disclosure have at least the following technical effects or advantages.

First, the coordinates of the each point of the N points of the display unit correspond to coordinates of each touch sensitive point of the touch sensitive unit, when it is detected that the third display mode of the display unit of the electronic device is the second display mode, when the touch sensitive unit and the display unit are separated from each other and the electronic device is turned on and at the first timing, in the embodiment of the present disclosure. Therefore, the staying location of the cursor on the display unit may be determined directly by the correspondence between the N points of the display unit and the N touch sensitive points of the touch sensitive unit. Then, the technical problem of inaccurate cursor location when the touch sensitive unit and the display unit are in the separate state of the existing electronic device is solved. Further, the technical effect of a more accurate cursor location when the touch sensitive unit and the display unit are in the separate state is achieved, and it is more convenient for the user to use and the user experience is better.

Second, in the embodiments of the present disclosure, when performing the first control instruction to correspond the coordinates of the each point of the N points to coordinates of each touch sensitive point of the touch sensitive unit, M first touch sensitive points out of the N touch sensitive points of a first operating object may be acquired, J points corresponding to the M first touch sensitive points are acquired on the display unit based on the M first touch sensitive points, and a cursor at the location of each point of the J points is allocated. When M is an integer above 2, multi-point operation may be performed on the display unit by the touch sensitive point. The operation procedure is further simplified, and the operation is easier, which is more convenient for the user to use and the user experience is better.

Third, in the embodiments of the present disclosure, the current display mode of the display unit may be adjusted by the first adjustment instruction for adjusting the display mode of the display unit at the second timing after the first timing, so that the display mode of the display unit is adjusted from the second display mode to the first display mode. Also, the correspondence between the touch sensitive unit and the display unit is different in different display modes. Thus, the electronic device provides multiple display modes for the user to select. The user may adjust the display mode of the display unit according to his/her own use hobbit. The application of the electronic device is improved, and it is further convenient for the user to use, and the user experience is better.

The embodiment of the present disclosure also provides an electronic device comprising a touch sensitive unit and a display unit separated from each other, the electronic device comprising at least a first display mode, and a second display mode suitable for the touch sensitive unit. The electronic device is for example an electronic device such as a tablet computer, a notebook computer, a PC etc.

The touch sensitive unit is for example a touch sensitive board, a touch screen and so on. Further, the display unit is for example a LCD display, a LED display and so on.

Figure 4:
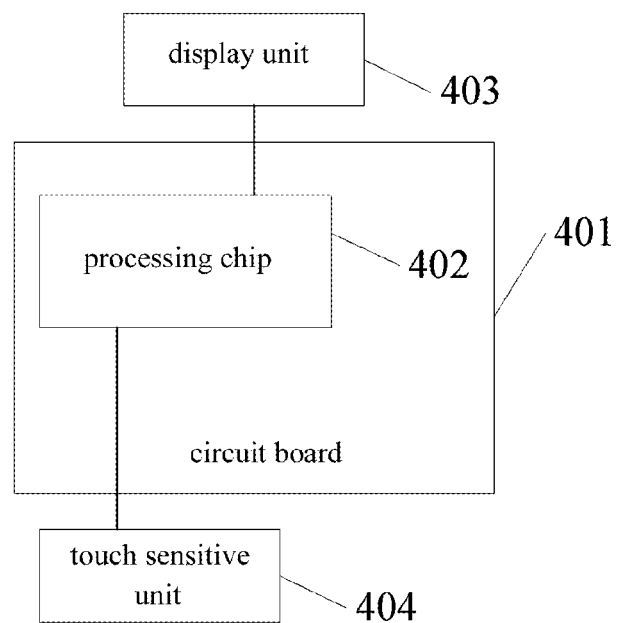
FIG. 4 is a structural schematic diagram showing an electronic device according to the first embodiment of the present disclosure.

Referring to FIG. 4, the electronic device comprises an electronic board 401; and a processing chip 402 disposed on the electronic board 401, which is configured to acquire a third display mode of the display unit 403 at a first timing when the electronic device is turned on, to detect whether the third display mode is the second display mode or not, to acquire coordinates of each point of N points of the display unit and generate a first control instruction when the third display mode is the second display mode, wherein N is an integer above 2, and to perform the first control instruction, to correspond the coordinates of the each point of the N points to coordinates of each touch sensitive point of the touch sensitive unit 404.

The electronic board 401 may be the main board of the electronic device. Further, the processing chip 402 may be a discrete processing chip or be integrated into the processor.

Further, the processing chip 402 comprises an absolute location unit, configured to acquire the coordinates of each touch sensitive point of the N touch sensitive points of the touch sensitive unit when performing the first control instruction, and to correspond the coordinates of each point of the N points to the coordinates of each touch sensitive point of the N touch sensitive points.

In an embodiment, the notebook is installed with UNIX system and iOS system. When the notebook is operating UNIX system, the first display mode is used by the display screen of the notebook. When the notebook is operating iOS system, the second display mode is used by the display screen of the notebook. When the notebook is turned on and at the first timing of 10:15, the third display mode of the display screen is acquired, and it is detected that the operated system in the notebook is iOS system. Then, it is determined that the third display mode is the second display mode, and the coordinates of the each point of the N points of the display unit correspond to coordinates of each touch sensitive point of N touch sensitive units of the touch sensitive unit.

Further, the processing chip 402 comprises a relative location unit, configured to acquire a first location of a cursor on the display unit when the third display mode is the first display mode after detecting whether the third display mode is the second display mode or not, to acquire a movement track parameter indicating the movement on the touch sensitive unit of a first operating object corresponding to the electronic device, to acquire a second location of the cursor on the display unit based on the first location and the movement track parameter; and to adjust the cursor from the first location to the second location.

Further, the processing chip 402 comprises a cursor control unit, configured to acquire M first touch sensitive points out of the N touch sensitive points of a first operating object corresponding to the electronic device, wherein, M is an integer no less than 1 and larger than N, after performing the first control instruction, to correspond the coordinates of the each point of the N points to coordinates of each touch sensitive point of the touch sensitive unit, to acquire J points on the display unit corresponding to each touch sensitive point of the M first touch sensitive points based on the M first touch sensitive points, wherein, J is equal to M, and to allocate a cursor at the location of each point of the J points.

Further, the processing chip 402 comprises a mode adjustment unit, configured to detect whether a first adjustment instruction for adjusting display mode of the display unit is received or not, at a second timing after the first timing, after performing the first control instruction, and to adjust the display unit from the second display mode to the first display mode, when the first adjustment instruction is received.

Further, the processing chip 402 comprises a mode detection unit, configured to detect whether the operating system of the electronic device is WINDOWS 8 or not, and to detect whether the third display mode is the second display mode by detecting whether the electronic device is operating Metro program, when the operating system of the electronic device is WINDOWS 8.

The one or more technical solutions provided in the embodiments of the present disclosure have at least the following technical effects or advantages.

First, the coordinates of the each point of the N points of the display unit correspond to coordinates of each touch sensitive point of the touch sensitive unit, when it is detected that the third display mode of the display unit of the electronic device is the second display mode, when the touch sensitive unit and the display unit are separated from each other and the electronic device is turned on and at the first timing, in the embodiment of the present disclosure. Therefore, the staying location of the cursor on the display unit may be determined directly by the correspondence between the N points of the display unit and the N touch sensitive points of the touch sensitive unit. Then, the technical problem of inaccurate cursor location when the touch sensitive unit and the display unit are in the separate state of the existing electronic device is solved. Further, the technical effect of a more accurate cursor location when the touch sensitive unit and the display unit are in the separate state is achieved, and it is more convenient for the user to use and the user experience is better.

Second, in the embodiments of the present disclosure, when performing the first control instruction to correspond the coordinates of the each point of the N points to coordinates of each touch sensitive point of the touch sensitive unit, M first touch sensitive points of the touch sensitive unit touched by a first operating object may be acquired, J points on the display unit corresponding to the M first touch sensitive points are acquired based on the M first touch sensitive points, and a cursor at the location of each point of the J points is allocated. When M is an integer above 2, multi-point operation may be performed on the display unit by the touch sensitive point. The operation procedure is further simplified, and the operation is easier, which is more convenient for the user to use and the user experience is better.

Third, in the embodiments of the present disclosure, the current display mode of the display unit may be adjusted by the first adjustment instruction for adjusting the display mode of the display unit at the second timing after the first timing, so that the display mode of the display unit is adjusted from the second display mode to the first display mode. Also, the correspondence between the touch sensitive unit and the display unit is different in different display modes. Thus, the electronic device provides multiple display modes for the user to select. The user may adjust the display mode of the display unit according to his/her own use hobbit. The application of the electronic device is improved, and it is further convenient for the user to use, and the user experience is better.

Although the preferred embodiments of the present disclosure have been described, those skilled in the art may make further modifications and alternations to these embodiments are possible after understanding the basic inventive concept. Therefore, it is intended to comprise all the preferred embodiments and all the modifications and alternations falling within the scope of the present disclosure by the appended claims.

Obviously, those skilled in the art may vary or change the embodiments of the present disclosure without departing from the spirit and scope of the present disclosure. Then, the variations and changes fall within the scope of the present disclosure defined by the claims appended and its equivalents, and it is intended to compass those variations and changes by the present disclosure as well.

The invention claimed is:

1. An information processing method applied to an electronic device comprising a touch sensitive unit and a display unit separated from each other, the electronic device comprising at least a first display mode, which is a traditional display mode suitable for the display unit, and a second display mode suitable for the touch sensitive unit, the method comprising:

acquiring a display mode of the display unit according to whether an operating system operating in the electric device is an operating system suitable for the touch sensitive unit, and/or according to whether an application is operating in the electronic device, at a first timing after the electronic device is turned on;

detecting whether the display mode is the second display mode or not according to the operating system or the application;

acquiring coordinates of each point of N points of the display unit and generating a first control instruction, when the display mode is the second display mode, wherein N is an integer above 2; and performing the first control instruction, to correspond the coordinates of the each point of the N points to coordinates of each touch sensitive point of the touch sensitive unit, wherein, after the step of detecting whether the display mode is the second display mode or not, the method further comprising:

acquiring a first location of a cursor on the display unit when the display mode is the first display mode;

acquiring a movement track parameter indicating the movement on the touch sensitive unit of an operating object corresponding to the electronic device;

acquiring a second location of the cursor on the display unit based on the first location and the movement track parameter; and adjusting the cursor from the first location to the second location;

wherein, after the step of performing the first control instruction, to correspond the coordinates of the each point of the N points to coordinates of each touch sensitive point of the touch sensitive unit, the method further comprises:

detecting whether a first adjustment instruction for adjusting display mode of the display unit is received or not, at a second timing after the first timing; and adjusting the display unit from the second display mode to the first display mode, when the first adjustment instruction is received, wherein, after the step of performing the first control instruction, to correspond the coordinates of the each point of the N points to coordinates of each touch sensitive point of the touch sensitive unit, the method further comprising:

acquiring M first touch sensitive points out of the N touch sensitive points of the touch sensitive unit by a first operating object corresponding to the electronic device, wherein, M is an integer no less than 1 and larger than N;

acquiring J points on the display unit corresponding to each touch sensitive point of the M first touch sensitive points, based on the M first touch sensitive points, wherein, J is equal to M; and allocating a cursor at the location of each point of the J points.

2. The method of claim 1, wherein, the step of performing the first control instruction, to correspond the coordinates of the each point of the N points to coordinates of each touch sensitive point of the touch sensitive unit comprising:

acquiring the coordinates of each touch sensitive point of the N touch sensitive points of the touch sensitive unit when performing the first control instruction; and corresponding the coordinates of each point of the N points to the coordinates of each touch sensitive point of the N touch sensitive points.

3. The method of claim 1, wherein, the step of detecting whether the display mode is the second display mode or not comprising:

detecting whether the operating system of the electronic device is WINDOWS 8 or not; and detecting whether the display mode is the second display mode by detecting whether the electronic device is operating Metro program, when the operating system of the electronic device is WINDOWS 8.

4. An electronic device comprising a touch sensitive unit and a display unit separated from each other, the electronic device comprising at least a first display mode, which is a traditional display mode suitable for the display unit, and a second display mode suitable for the touch sensitive unit, the electronic device comprising:

an electronic board; and a processing chip disposed on the electronic board, which is configured to acquire a display mode of the display unit according to whether an operating system operating in the electronic device is an operating system suitable for the touch sensitive unit, and/or according to whether an application is operating in the electronic device, at a first timing after the electronic device is turned on, to detect whether the display mode is the second display mode or not according to the operating system or the application, to acquire coordinates of each point of N points of the display unit and generate a first control instruction when the display mode is the second display mode, wherein N is an integer above 2, and to perform the first control instruction, to correspond the coordinates of the each point of the N points to coordinates of each touch sensitive point of the touch sensitive unit, wherein, the processing chip is configured to acquire a first location of a cursor on the display unit when the display mode is the first display mode after detecting whether the display mode is the second display mode or not, to acquire a movement track parameter indicating the movement on the touch sensitive unit of an operating object corresponding to the electronic device, to acquire a second location of the cursor on the display unit based on the first location and the movement track parameter; and to adjust the cursor from the first location to the second location;

wherein, the processing chip is configured to detect whether a first adjustment instruction for adjusting display mode of the display unit is received or not, at a second timing after the first timing, after performing the first control instruction to correspond the coordinates of each point of the N points to the coordinates of each touch sensitive point of the N touch sensitive points; and to adjust the display unit from the second display mode to the first display mode, when the first adjustment instruction is received, wherein, the processing chip is configured to acquire M first touch sensitive points out of the N touch sensitive points of the touch sensitive unit touched by an operating object corresponding to the electronic device, wherein, M is an integer no less than 1 and larger than N, after performing the first control instruction, to correspond the coordinates of the each point of the N points to coordinates of each touch sensitive point of the touch sensitive unit; to acquire J points on the display unit corresponding to each touch sensitive point of the M first touch sensitive points based on the M first touch sensitive points, wherein, J is equal to M; and to allocate a cursor at the location of each point of the J points.

5. The electronic device of claim 4, wherein, the processing chip is configured to acquire the coordinates of each touch sensitive point of the N touch sensitive points of the touch sensitive unit when performing the first control instruction, and to correspond the coordinates of each point of the N points to the coordinates of each touch sensitive point of the N touch sensitive points.

6. The electronic device of claim 4, wherein, the processing chip is configured to detect whether the operating system of the electronic device is WINDOWS 8 or not, and to detect whether the display mode is the second display mode by detecting whether the electronic device is operating Metro program, when the operating system of the electronic device is WINDOWS 8.

* * * * *